(12) United States Patent
Bartolucci et al.

(10) Patent No.: US 12,381,947 B2
(45) Date of Patent: Aug. 5, 2025

(54) COMPUTER-IMPLEMENTED SYSTEM AND METHOD FOR PROPAGATION AND COMMUNICATION OF DATA IN A NETWORK SUCH AS A BLOCKCHAIN NETWORK

(71) Applicant: nChain Licensing AG, Zug (CH)

(72) Inventors: Silvia Bartolucci, London (GB); Daniel Joseph, London (GB); Simone Madeo, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/221,338

(22) Filed: Jul. 12, 2023

(65) Prior Publication Data

US 2024/0015211 A1 Jan. 11, 2024

Related U.S. Application Data

(63) Continuation of application No. 17/592,387, filed on Feb. 3, 2022, now Pat. No. 11,743,328, which is a (Continued)

(30) Foreign Application Priority Data

Nov. 27, 2017 (GB) .................................. 1719654

(51) Int. Cl.
*H04L 67/1074* (2022.01)
*G06Q 20/06* (2012.01)
(Continued)

(52) U.S. Cl.
CPC ......... *H04L 67/108* (2013.01); *G06Q 20/065* (2013.01); *H04L 45/16* (2013.01); *H04L 63/1441* (2013.01)

(58) Field of Classification Search
CPC .... H04L 67/108; H04L 45/16; H04L 63/1441
See application file for complete search history.

(56) References Cited

U.S. PATENT DOCUMENTS 9,668,238 B1* 5/2017 Sevindik .................. H04L 1/00
9,826,431 B2* 11/2017 Mineta .................. H04B 1/707
(Continued)

FOREIGN PATENT DOCUMENTS

JP          2011164677 A      8/2011
JP          2012050025 A      3/2012
(Continued)

OTHER PUBLICATIONS

Akcora et al., "Blockchain: A Graph Primer," arXiv preprint arXiv: 1708.08749, Aug. 10, 2017, https://pdfs.semanticscholar.org/1098/64228a62da90454f4d41dfced7c274939f7f.pdf, 16 pages.
(Continued)

*Primary Examiner* — Kenny S Lin
(74) *Attorney, Agent, or Firm* — Tarolli, Sundheim, Covell & Tummino LLP

(57) ABSTRACT

A method of propagating data packets in a network of nodes is disclosed. The method, implemented at one of the nodes, includes: generating at least one data packet of a first type; collecting a set of data packets of the first type during a first time period, the set including the at least one generated data packet and one data packet of the first type received from one or more first nodes in the network; and for each data packet in the set: randomly select two or more neighbouring nodes connected to said one of the nodes; transmit, to each of the two or more selected neighbouring nodes: the data packet, wherein the two or more selected neighbouring nodes are configured to relay the data packet to one or more second nodes in the network using a mode of data propagation arbitrarily selected for that neighbouring node.

17 Claims, 7 Drawing Sheets

Related U.S. Application Data continuation of application No. 16/767,559, filed as application No. PCT/IB2018/059092 on Nov. 19, 2018, now Pat. No. 11,245,757.

(51) Int. Cl.
  *H04L 9/40* (2022.01)
  *H04L 45/16* (2022.01)

(56) References Cited

U.S. PATENT DOCUMENTS

| | | | |
|---|---|---|---|
| 2004/0025436 A1 | 2/2004 | Canino | |
| 2007/0009102 A1 | 1/2007 | Gong et al. | |
| 2009/0061871 A1* | 3/2009 | Gross | H04W 36/0061 455/436 |
| 2011/0085442 A1* | 4/2011 | Lin | H04W 40/248 370/328 |
| 2012/0050025 A1 | 3/2012 | Hoeffel | |
| 2012/0297405 A1 | 11/2012 | Zhang et al. | |
| 2013/0091294 A1 | 4/2013 | El-Beltagy et al. | |
| 2013/0120523 A1* | 5/2013 | Zhang | H04L 67/1095 348/14.08 |
| 2015/0195189 A1* | 7/2015 | Winzer | H04L 45/48 709/241 |
| 2015/0372897 A1 | 12/2015 | Han et al. | |
| 2016/0269102 A1 | 9/2016 | Park | |
| 2017/0026468 A1 | 1/2017 | Kumar et al. | |
| 2019/0082007 A1 | 3/2019 | Klarman et al. | |
| 2019/0098625 A1 | 3/2019 | Johnson et al. | |
| 2020/0403899 A1 | 12/2020 | Bartolucci et al. | |

FOREIGN PATENT DOCUMENTS

| | | |
|---|---|---|
| JP | 2016528763 A | 9/2016 |
| JP | 2017188883 A | 10/2017 |
| WO | 2017065209 A1 | 4/2017 |
| WO | 2017109140 A1 | 6/2017 |
| WO | 2017199807 A1 | 11/2017 |

OTHER PUBLICATIONS

Antonopoulos, "Mastering Bitcoin—Unlocking Digital Cryptocurrencies," O'Reilly Media, Inc., Dec. 20, 2014, 282 pages.

Biryukov et al., "Deanonymisation of clients in Bitcoin P2P network," Proceedings of the 2014 ACM SIGSAC Conference on Computer and Communications Security, Nov. 3, 2014, 15 pages.

Fanti et al., "Dandelion: Privacy-Preserving Transaction Propagation," Jun. 6, 2017, 4 pages.

International Search Report and Written Opinion mailed Feb. 18, 2019, Patent Application No. PCT/IB2018/059092, 12 pages.

Maxwell et al., "Blocksonly mode BW savings, the limits of efficient block xfer, and better relay," Bitcoin Forum, Feb. 26, 2016, https://bitcointalk.org/index.php?topic=1377345.msg, 13 pages.

Miller et al., "bips/bip-dandelion.mediawiki," GitHub, Jun. 10, 2017, https://github.com/gfanti/bips/blob/master/bip-dandelion.mediawiki, 8 pages.

Nakamoto, "Bitcoin: A Peer-to-Peer Electronic Cash System," Bitcoin, Oct. 31, 2008, https://bitcoin.org/bitcoin.pdf, 9 pages.

Neudecker et al., "Timing Analysis for Inferring the Topology of the Bitcoin Peer-to-Peer Network," 2016 International IEEE Conferences on Ubiquitous Intelligence & Computing, Advanced and Trusted Computing, Scalable Computing and Communications, Cloud and Big Data Computing, Internet of People, and Smart World Congress (UIC/ATC/ScalCom/CBDCom/IoP/SmartWorld), Jul. 18, 2016, https://www.dsn.kastel.kit.edu/publications/files/323/bitcoin_timing_analysis_dsn.pdf, 10 pages.

Pustogarov, "Deanonymisation techniques for Tor and Bitcoin," PhD Dissertation, The Faculty of Sciences, Technology and Communication, Docteur de L'Université du Luxembourg en Informatique, Jun. 12, 2015, https://brbilu.uni.lu/bitstream/10993/21798/1/phdthesis-pustogarov.pdf, 135 pages.

Satoshi et al., "Connection Limits," Bitcoin Forum, Aug. 9, 2010, https://bitcointalk.org/index.php?topic=741.0;brev_next=prev, 2 pages.

UK Commercial Search Report mailed Feb. 28, 2017, Patent Application No. GB1719654.4, 6 pages.

Uk IPO Search Report mailed May 9, 2018, Patent Application No. GB1719654.4, 4 pages.

Van Renesse, "A Blockchain Based on Gossip?—a Position Paper," Cornell University, 2016, https://www.zurich.ibm.com/dccl/papers/renesse_dccl.pdf, 4 pages.

Wang et al., "Towards Better Understanding of Bitcoin Unreachable Peers," arXiv preprint arXiv:1709.06837, Sep. 20, 2017, https://arxiv.org/pdf/1709.06837.pdf, 7 pages.

* cited by examiner

COMPUTER-IMPLEMENTED SYSTEM AND METHOD FOR PROPAGATION AND COMMUNICATION OF DATA IN A NETWORK SUCH AS A BLOCKCHAIN NETWORK

CROSS REFERENCE TO RELATED APPLICATIONS

This application is a continuation of U.S. patent application Ser. No. 17/592,387, filed Feb. 3, 2022, which is a continuation of U.S. patent application Ser. No. 16/767,559, filed May 27, 2020, now U.S. Pat. No. 11,245,757, which is a 371 National Stage of International Patent Application No. PCT/IB2018/059092, filed Nov. 19, 2018, which claims priority to United Kingdom Patent Application No. 1719654.4, filed Nov. 27, 2017, the disclosures of which are incorporated herein by reference in their entirety.

FIELD OF INVENTION

This invention relates generally to computer networks, and more particularly to methods and devices to propagate data in a network of nodes. The invention is suited for but not limited to use in conjunction with a blockchain network.

BACKGROUND OF INVENTION

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction will quickly try to push that transaction out to other nodes in the network. Before transmitting a new transaction to other nodes, it is "validated", meaning it is checked against a set of criteria to ensure the transaction meets the basic requirements for a proper transaction according to the applicable blockchain protocol.

In order for a transaction to be written to the blockchain, it is incorporated into a block by a node (a "miner" or "mining node") that is designed to collect transactions and form them into blocks. The miner then attempts to complete a "proof of work" with respect to the node. Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

One of the perceived advantages of blockchain technology, such as Bitcoin, is the anonymity of transactions. Personal details of a Bitcoin user are not formally and explicitly attached to Bitcoin addresses, and the Bitcoin ledger of the blockchain only contains public address information. However, since a blockchain is structured as a distributed, peer-to-peer network operating on top of the Internet, anonymity of transactions may be compromised by attacks that use Internet Protocol (IP) address information to link users with network activity. By way of illustration, de-anonymization attacks, such as IP traffic analysis, conducted on a blockchain-based network may enable interested third-parties to monitor transactions submitted by users on the network and use publicly available information to link the transactions to their sources, for example, by linking user's public keys with their IP addresses.

Traffic analysis is particularly problematic for a blockchain-based network, which relies on propagation of transactions by and between network nodes. Each node in the network that receives a transaction validates the transaction and subsequently sends it to peer nodes. In the Bitcoin protocol, a node will send an "INV" message containing a list of transactions to a peer node and receive a "GETDATA" response message selecting some subset of the transactions advertised in the "INV" message. The node then sends the requested transactions to the peer node. This process is carried out with respect to each peer node to which the node is connected. An attacker may intercept and analyse data that is transmitted when transactions are propagated in the network, and ultimately gain information which can be used to link sources and destinations of transactions.

It would be desirable to provide techniques for propagating transactions in blockchain-based networks which may reduce the likelihood of compromise of network anonymity through traffic analysis or other types of de-anonymization attacks. More generally, it would be desirable to provide techniques for relaying data between nodes of a peer-to-peer network to reduce the vulnerability to de-anonymization attacks.

Such a solution has now been devised.

Thus, in accordance with the present invention there are provided methods and devices as defined in the appended claims.

SUMMARY OF INVENTION

The present application describes a node to propagate data packets in a network of nodes. Each node in the network may have one or more connections to other nodes. The node includes a processor, a network interface to provide network connectivity, and memory. The memory may include processor-executable instructions that, when executed by the processor, cause the processor to: generate at least one data packet of a first type; collect a set of data packets of the first type during a first time period, the set preferably including the at least one generated data packet and at least one data packet of the first type received from one or more first nodes in the network; and for each data packet in the set: arbitrarily select two or more neighbouring nodes connected to the node; and transmit the data packet to each of the two or more selected neighbouring nodes, wherein the two or more selected neighbouring nodes may be configured to relay the data packet to one or more second nodes in the network using a mode of data propagation that is randomly selected for that neighbouring node.

In some implementations, the first time period has a predefined length.

In some implementations, the instructions, when executed, cause the processor to perform the transmitting in response to determining that a triggering condition has been met.

In some implementations, the triggering condition comprises expiry of a predetermined duration since a time of generation of the at least one data packet of the first type by the node.

In some implementations, the triggering condition comprises expiry of a predetermined duration since a time of receipt of a first of the at least one data packet of the first type from the one or more first nodes.

In some implementations, the mode of data propagation for a neighbouring node is arbitrarily selected between a first mode and a second mode, where in the first mode, the data packet is relayed to an arbitrarily selected subset of nodes that are connected to the neighbouring node; and in the second mode, the data packet is relayed to all nodes connected to the neighbouring node.

In some implementations, the instructions, when executed, prevent the processor from transmitting any data packets of the first type during the first time period.

The present application may be described as providing a computer-implemented method of propagating data packets in a network of nodes. Each node in the network may have one or more connections to other nodes. The method, which may be implemented at one of the nodes, may include: generating at least one data packet of a first type; collecting a set of data packets of the first type during a first time period, the set preferably including the at least one generated data packet and at least one data packet of the first type received from one or more first nodes in the network; and for each data packet in the set: arbitrarily select two or more neighbouring nodes connected to said one of the nodes; transmit the data packet to each of the two or more selected neighbouring nodes, wherein the two or more selected neighbouring nodes are configured to relay the data packet to one or more second nodes in the network using a mode of data propagation that is randomly selected for that neighbouring node The present application may further describe a non-transitory processor-readable medium storing processor-executable instructions to participate in a process for propagating data packets in a network of nodes, wherein the processor-executable instructions, when executed by a processor in one of a plurality of participating nodes, cause the processor to carry out the operations of one or more of the methods described herein.

In many of the example implementations described herein, specific reference is made to blockchain transactions; however, it will be appreciated that the methods and devices described herein may be implemented and applied in connection with non-blockchain transactions propagation. More generally, the methods and devices described in the present disclosure may be suitable for use in propagating data among the nodes of a peer-to-peer network.

BRIEF DESCRIPTION OF THE DRAWINGS

Any feature described in relation to one aspect or embodiment of the invention may also be used in respect of one or more other aspects/embodiments. These and other aspects of the present invention will be apparent from and elucidated with reference to, the embodiment described herein. An embodiment of the present invention will now be described, by way of example only, and with reference to the accompany drawings, in which.

DETAILED DESCRIPTION

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
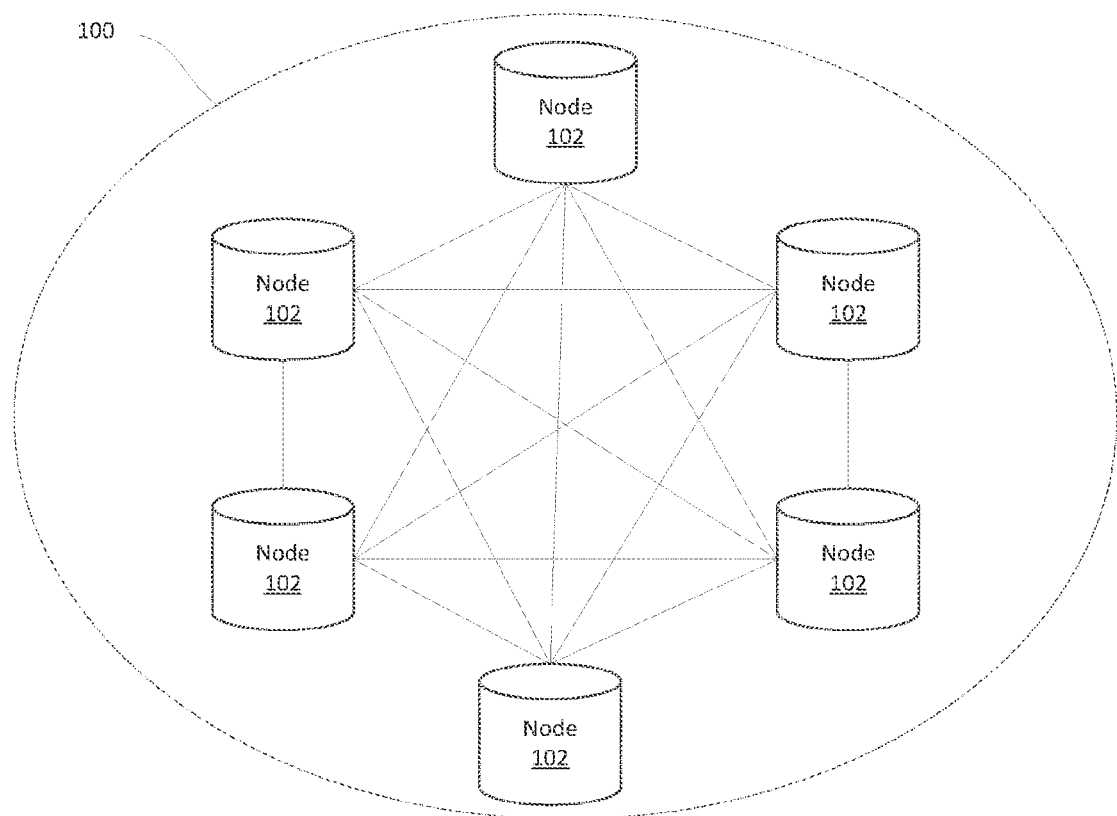
FIG. 1 illustrates an example network associated with a blockchain.

Reference will first be made to FIG. 1 which illustrates, in block diagram form, an example network associated with a blockchain, which may be referred to herein as a blockchain network 100. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks, each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 can fulfil numerous different functions, from network routing to wallet services, to maintain a robust and secure decentralized public ledger. "Full nodes" contain a complete and up-to-date copy of the blockchain, and can therefore verify any transactions (spent or unspent) on the public ledger. "Lightweight nodes" (or SPV) maintain a subset of the blockchain and can verify transactions using a "simplified payment verification" technique. Lightweight nodes only download the headers of blocks, and not the transactions within each block. These nodes therefore rely on peers to verify their transactions. "Mining nodes", which can be full or lightweight nodes, are responsible for validating transactions and creating new blocks on the blockchain. "Wallet nodes", which are typically lightweight nodes, handle wallet services of users. Nodes 102 communicate with each other using a connection-oriented protocol, such as TCP/IP (Transmission Control Protocol).

When a node wishes to send a transaction to a peer, an "INVENTORY" message is sent to the peer, transmitting one or more inventory objects that is known to the transmitting node. If the peer replies with a "GETDATA" message, i.e. a full transaction request, the transaction is sent using a "TRANSACTION" message. The node receiving the transaction forwards it in the same manner—given that it is a valid transaction—to its peers.

Figure 2:
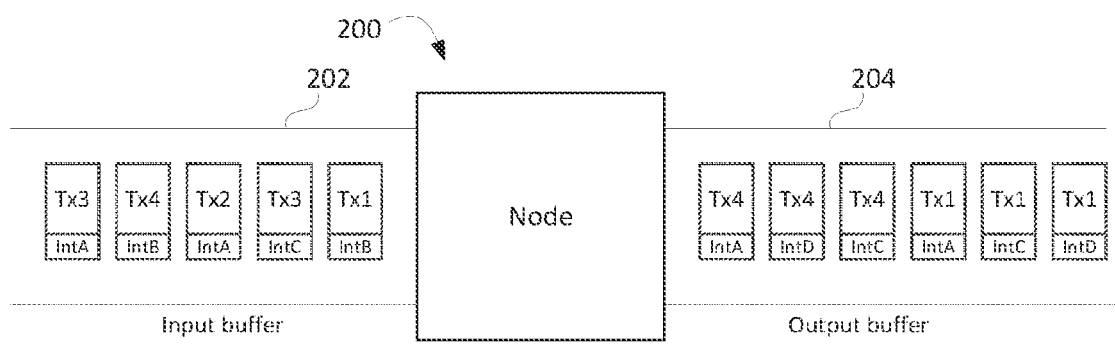
FIG. 2 diagrammatically shows an example blockchain node with an input buffer and an output buffer.

Reference is now made to FIG. 2, which diagrammatically shows an example node 200 with an input buffer 202 and an output buffer 204. The example node 200 has network interfaces with multiple peer nodes, referenced as intA, intB, intC, intD, etc. The input buffer 202 shows incoming transactions from the various peer nodes, and the output buffer 204 shows output network packets, corresponding to transactions, for transmission to peer nodes over the respective interfaces. Network packets are serially sent and received at an application-level according to the primitives provided by the operating system of the node 202. Assuming that a transaction x fits in a single Ethernet/IP packet, its transmission to m peers requires the buffering of m different output network packets. Both input and output network packets, along with other information, will contain a serialized transaction and a logical interface ID representing the TCP/IP connection to the sending/receiving peer.

Once a Bitcoin transaction is generated, the source node broadcasts the transaction message over the network. Generally, when a client generates a transaction, it is put in the output buffer 204. The transaction may or may not be forwarded immediately to the peers. In current implementations of the Bitcoin network, transactions are propagated by a mechanism known as "diffusion propagation", whereby each transaction source transmits the transaction to its neighbours with an independent, exponential delay. The delays in propagation are random, and are useful to introduce uncertainty in timing estimates for a malicious attacker. Once a peer receives a certain transaction, the peer does not accept future relays of the same transaction; for example, the transaction hash may be stored in the peer's memory pool, allowing the peer to reject identical transactions. The "diffusion" of transactions through the network is symmetric, meaning that a forwarding node does not use information about the IP addresses of the neighbouring nodes to influence the transaction broadcast. For example, in "standard" diffusion processes (utilized in the Bitcoin protocol), the peers of a broadcasting node all receive the same transaction and in each relay instance only one transaction at a time is relayed per peer. The symmetric nature of this "diffusion" may be exploited by malicious third parties having knowledge of the peer-to-peer graph structure of the network in conducting de-anonymizing attacks.

The present disclosure provides alternative techniques for transactions relay on blockchain networks, to improve anonymity protection against traffic analysis attacks. More particularly, the proposed relay protocols may be used to disguise connections between source nodes of transactions and their IP addresses.

In accordance with one aspect of the present application, a node in a blockchain-based network buffers new transactions over a period of time, accumulating transactions to be propagated to its peer nodes. The node then sends to an arbitrarily selected subset of these peer nodes different sets of the buffered/accumulated transactions. The transactions are propagated throughout the network in this manner, with each recipient node independently selecting a mode of relaying its received transaction to its own peers.

The proposed relay protocol, Diffusion Mixer Protocol (DMP), includes two independent diffusion stages. The first stage ("random differential relay") allows for relayed transactions mixing and the obfuscation of transaction sources. During the random differential relay stage, each node waits a predefined amount of time before broadcasting a transaction to the network, to collect more transactions from its peers. The node then creates outgoing connections to its "entry nodes", and sends to an arbitrarily (e.g. randomly) selected subset of these entry nodes different transactions with approximately the same timestamps. Entry nodes of a node are those neighbouring nodes to which direct outgoing connections can be established from the node. The randomness in the choice of entry nodes and the diversity in the relayed transactions may make the reconstruction of the network topology more difficult for an attacker.

The second stage ("standard diffusion") ensures a timely and reliable propagation of transactions within the network. In the standard diffusion stage, each node relays the same transaction to all its entry nodes, and in each relay instance only one transaction at a time is relayed per entry node.

It should be noted that in a network of nodes, such as a blockchain network, one or more of the nodes may be capable of implementing the DMP. Specifically, one or more of the nodes of the network may be able to relay its received data packets to its entry nodes by participating in the DMP. A participating node may, for example, select between a random differential relay process and a standard diffusion process, for propagating a particular data packet. The nodes of the network may elect to participate in the DMP, joining the protocol either via a decentralized manner or through inclusion in a group of participating nodes assembled by a central authority. A participating node will relay its output network packets according to the DMP. In particular, if a participating node receives a data packet, the node may forward the received data packet according to a mode of propagation that is selected for that node, using the rules stipulated by the DMP.

Figure 3:
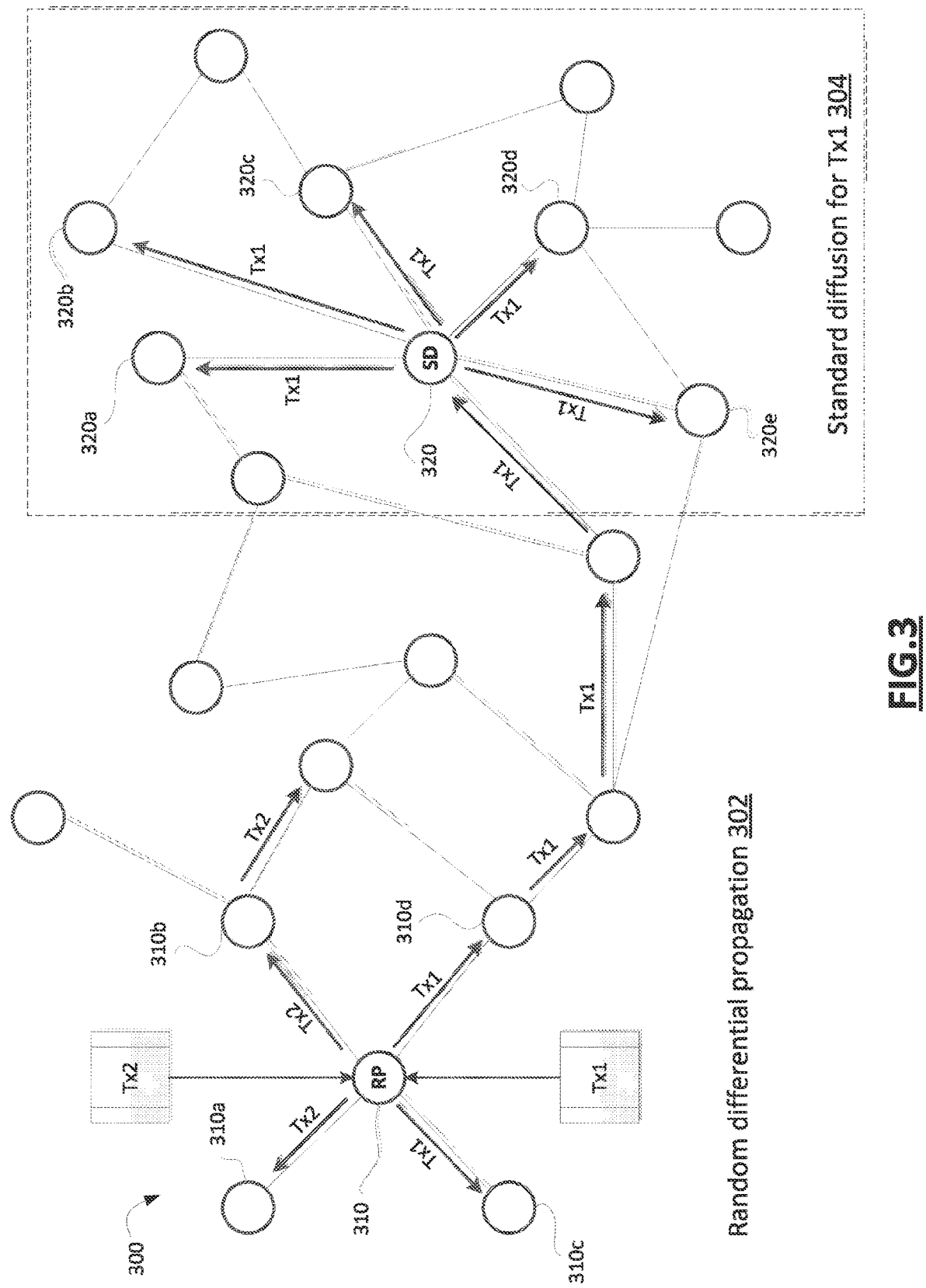
FIG. 3 illustrates the propagation of a transaction in an example network of nodes.

A schematic visualization of the DMP for transactions relay is provided in FIG. 3. An example blockchain network 300 of nodes is shown. Each node represents a network terminal (i.e., a blockchain node), while edges represent links between nodes. For the purposes of this illustration, it is supposed that for each link it is possible to send or receive a single bit at a time.

In this example network 300, each node maintains a mempool of unconfirmed transactions so when a node receives a new transaction it is propagated through the network to all other nodes. Each node is to validate and store the new transactions in their respective local mempool and forward the new transactions to any peer nodes that do not yet have the new transactions. Due to the peer-to-peer nature of the blockchain network 300, all nodes do not receive a new transaction at the same time, meaning it will take some time for a new transaction to reach all nodes in the network 300. For example, in a current implementation of the Bitcoin network a new valid transaction will take an average of 3.5 seconds to reach the 90% of the nodes of the Bitcoin network.

FIG. 3 illustrates the two stages of the DMP for propagating a particular transaction Tx1, namely the random differential propagation 302 and the standard diffusion for Tx1 304. The source node 310 of transaction Tx1 may either create the transaction Tx1 or receive it from a peer node, at a time, $t_1$. In accordance with the DMP, source node 310 waits to receive at least one more incoming transaction from its neighbouring nodes prior to initiating broadcast of the received/queued transactions. In the example of FIG. 3, once transaction Tx2 is received by source node 310, the transactions Tx1 and Tx2 are sent to an arbitrarily selected subset of the source node 310's entry nodes. Transaction Tx1 is forwarded to entry nodes 310c and 310d while transaction Tx2 is forwarded to entry nodes 310a and 310b. The example of FIG. 3 is only illustrative; in particular, the source node 310 may wait to receive two or more incoming transactions before propagating any of its received transactions.

The entry nodes relay the received transactions to their own peers. For example, nodes 310b and 310d forward transactions Tx2 and Tx1, respectively, to one or more of their neighbouring nodes. In the DMP, each recipient of a transaction independently selects a mode of propagating the received transaction. Node 320 is an example of a node which selects standard diffusion as its diffusion mode. As shown in FIG. 3, node 320 forwards the same transaction, Tx1, to all its entry nodes, namely 320a, 320b, 320c, 320d, and 320e.

Figure 5:
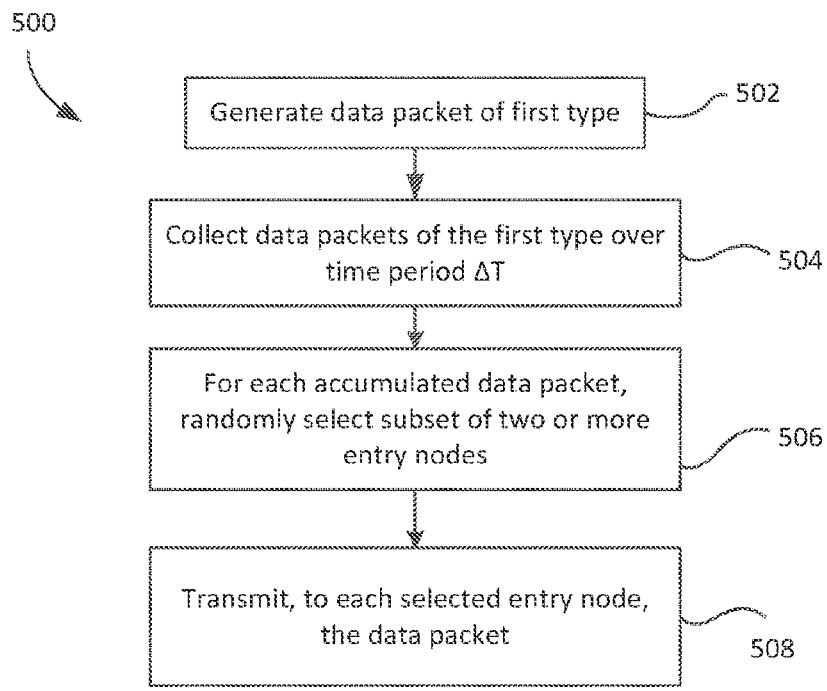
FIG. 5 shows, in flowchart form, an example process for propagating data packets in a blockchain network.

Reference is now made to FIG. 5, which shows, in flowchart form, an example process 500 for propagating data packets in a network. The process 500 is implemented by a node of, for example, a blockchain network, such as network 100. A node may be understood, in this context, to refer to a mining node, full node, validator node, or other type of discrete blockchain node in the blockchain network. The node is a computing device with network connection(s), computing resources, and executing software implementing the blockchain protocol.

In operation 502, the client associated with the node generates at least one data packet of a first type. In the context of a blockchain network, the data packet of a first type may comprise a blockchain transaction. That is, the client may generate a blockchain transaction which is to be propagated to the other nodes of the network.

In operation 504, the node collects a set of data packets of the first type during a first time period, T. That is, the node accumulates data packets of the first type over a period of time. The set includes the at least one generated data packet and at least one data packet of the first type that is received from one or more peer nodes in the network. In this way, the data packets generated by the node are mixed with those data packets of the same type that are received from neighbouring nodes. In a blockchain network, during the time period T, the node accumulates a set of transactions by monitoring the network for incoming transactions to be relayed. The length, $\Delta t$, of time period T may be predefined. In some example implementations, the length of time may vary based on parameters such as average connection times, average number of transactions received per unit of time, or the node's centrality (i.e. the number of incoming connections to the node) within the network. During the time period T, the node may only be permitted to accumulate data packets of the first type, and therefore may be prevented from transmitting any data packets of the first type for the duration of time period T.

In operation 506, the node arbitrarily selects a subset of its entry nodes to which different sets of the collected data packets will be forwarded. More specifically, for each data packet in the set of collected data packets, the node arbitrarily selects two or more of its entry nodes (i.e. neighbouring nodes, with which the node has outgoing connections), and assigns the data packet to the selected entry nodes. For example, the entry nodes may be selected randomly. The node may, in some implementations, query the network to obtain fresh addresses of its peers. In the Bitcoin network, the node may query one or more database source names (DSN) embedded in Bitcoin Core, BitcoinJ, or other blockchain protocol, and maintained by Bitcoin (or other blockchain) community members. As a response, the node will get one or more DSN records showing the IP addresses of available full nodes which may accept incoming connections. A decentralized version of peer discovery may be implemented by having peers send "ADDR" messages containing their IP addresses and port numbers to a new node that joins the network.

Figure 4:
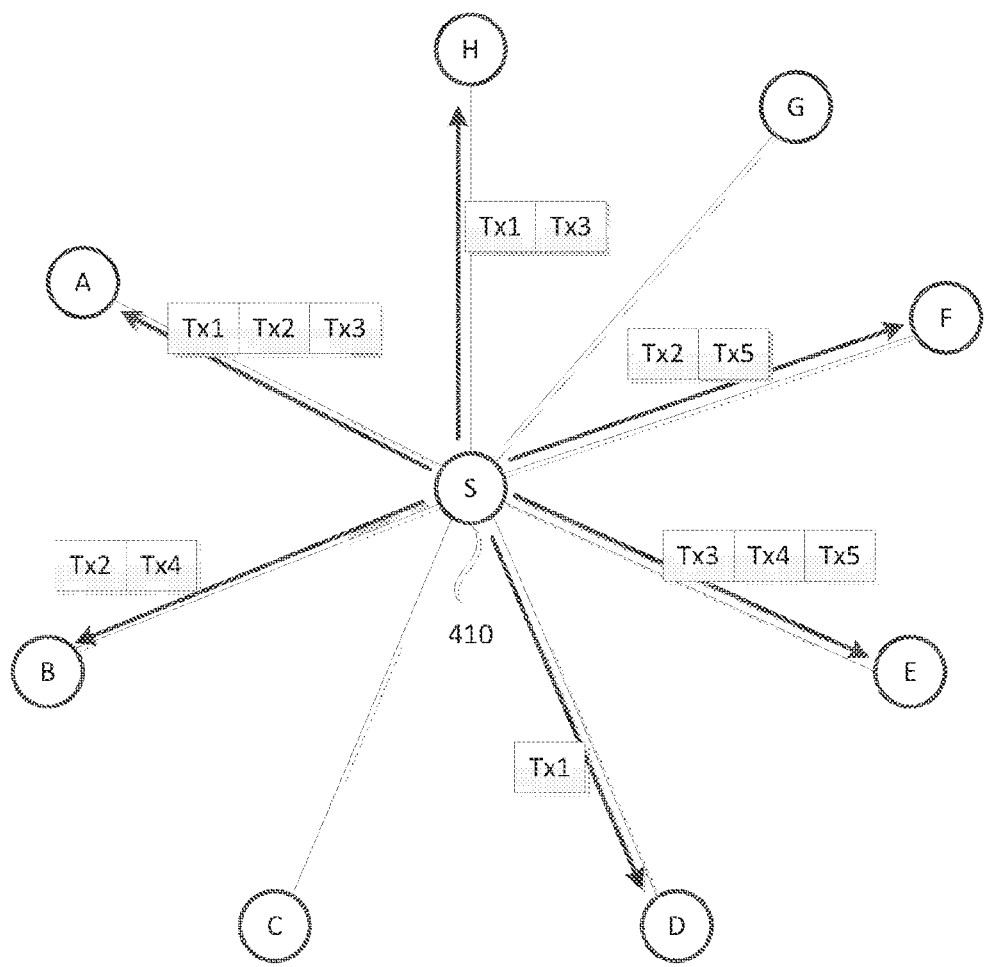
FIG. 4 illustrates an example of a relay of transactions in a network of nodes.

In some implementations, as part of operation 506, one or more of the nodes in a network may maintain a table or other data structure tracking its assignment of each collected data packet to an entry node that the data packet should be relayed to. FIG. 4 shows an example of transactions relay for source node 410 in the random differential propagation stage of the DMP in a blockchain network. Table 1 is an example assignment of the collected transactions, Tx1-Tx5, to the entry nodes of source node 410. The entry nodes are indicated as nodes A, B, C, D, E, F, G, and H. As shown in FIG. 4 and Table 1, the source node 410 relays each transaction to at least two entry nodes, and multiple transactions can be relayed via the same node. For example, transactions Tx3, Tx4, and Tx5 are all simultaneously relayed via entry node E. More generally, in the random differential propagation process, multiple data packets can be simultaneously relayed to the same peer node by a forwarding node. Not all entry nodes receive transactions from source node 410 in a given instance of the DMP. In the example of Table 1, entry nodes C and G do not receive any transactions from source node 410.

TABLE 1

| Transactions/Nodes | Relay 1 | Relay 2 | Relay 3 |
|---|---|---|---|
| Tx1 | Node A | Node D | Node H |
| Tx2 | Node E | Node B | Node F |
| Tx3 | Node E | Node A | Node H |
| Tx4 | Node B | Node E | |
| Tx5 | Node E | Node F | |

Referring again to FIG. 5, for each collected data packet, in operation 508, the node transmits the data packet to each of the (arbitrarily or randomly) selected entry nodes. Each selected entry node is configured to relay the data packet to one or more second nodes in the network using a mode of data propagation that is randomly selected for that entry node. That is, each selected entry node forwards the received data packet to one or more of its own peers using a propagation mode that is independently chosen for that entry node. In the example transactions relay of FIG. 4, each of transactions Tx1-Tx5 is forwarded to the entry nodes to which the transaction is assigned. In some implementations, as part of operation 508, the node may transmit, along with the data packet, an express command to the selected entry nodes (i.e. the recipient nodes) to forward the data packet using a randomly selected mode of propagation. Each node receiving a transaction from source node 410 then randomly selects a mode of propagation/diffusion to use in forwarding the received transaction to one or more of its peer nodes (if any). In particular, an entry node that receives a transaction selects, on a random basis, between relaying the transaction according to the standard diffusion process or the random differential propagation process. The choice between the two options is random. Thus, in the DMP, the two diffusion processes alternate probabilistically, i.e. there is not a clear separation between the random differential propagation stage and the standard diffusion stage. As a result of this "mixing" of diffusion processes, it becomes more difficult for an attacker to reconstruct a topology of the network based on identifying a separation between the sets of nodes relaying via random data propagation or via standard diffusion.

In some implementations, the random selection by an entry node of the diffusion mode may involve receiving, from the source node, a message in addition to the relayed data packet. The entry node may then generate a random value (e.g. random number), append it to the received message, and hash the result, for example, using SHA-256. The entry node can then check the hash value and subsequently obtain the diffusion mode based on predetermined rules regarding the hash value (e.g. if the final character of the hash is a digit, select the random differential propagation as mode of diffusion). Alternatively or additionally, the selection of the diffusion mode can be done using any randomized process (e.g. random number generator), where the probability of selecting one of the modes may be greater than that of selecting the other of the modes, depending on factors such as number of incoming and/or outgoing connections, average number of data packets received per unit of time, etc.

In propagating a particular data packet, it may be desirable to balance the level of anonymity protection for the propagating nodes with the overall speed of propagation. If the measures to ensure a certain level of anonymity are too cumbersome (e.g. requires too many network resources, nodes of the network are intentionally underutilized in relaying data packets, etc.), the efficacy of the network in timely spreading data may be impaired. Accordingly, in some implementations, the random selection of the mode of propagation by a relaying node may be weighted. In particular, different probabilities may be assigned to each of the two or more modes of propagation (i.e. random differential propagation, standard diffusion, etc.) so that the probabilities reflect the proportional significance of anonymity and speed of data propagation. For example, a higher predefined probability may be associated with the random differential propagation mode for the nodes of a particular network, reflecting a proportionally greater emphasis on preserving anonymity of the propagated data.

Figure 5A:
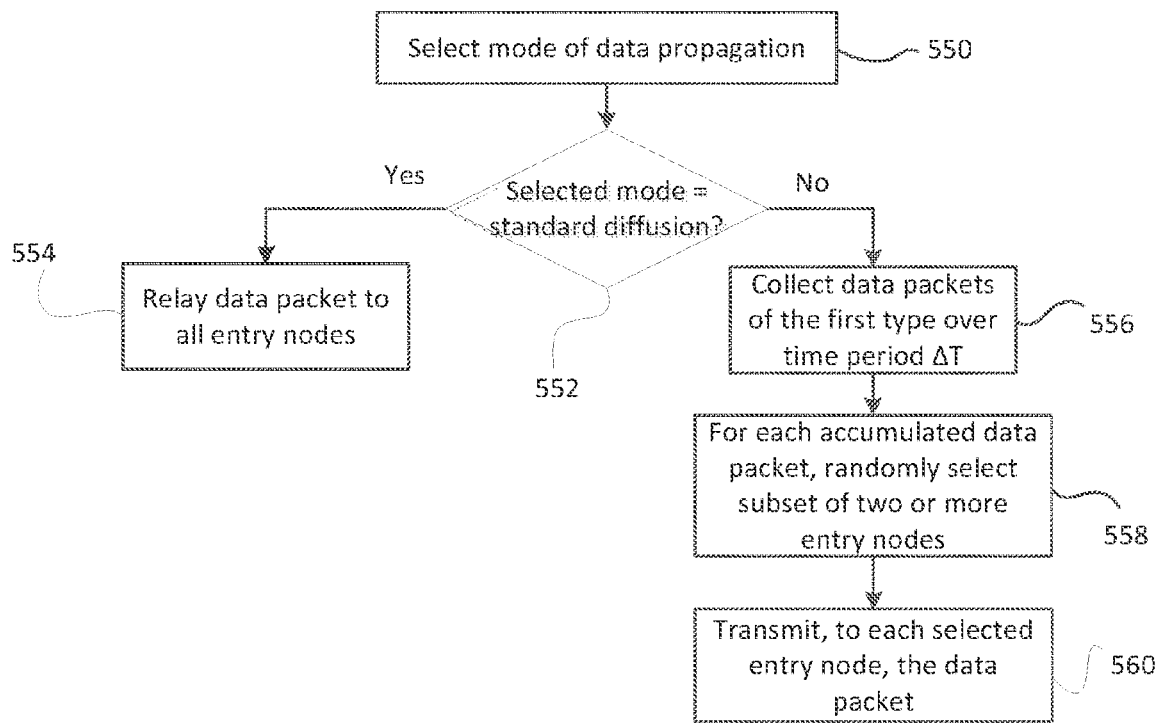
FIG. 5A shows an example process performed by a relay node in accordance with an illustrative embodiment of the invention.

The method 500 of FIG. 5 is implemented by a node which generates its own data packet of a first type. In particular, a node that participates in the DMP and generates a data packet for propagation to the rest of the network performs method 500. FIG. 5A shows an example process performed by a relay node, or a node which forwards a data packet that is generated by a different node. That is, a relay node is a node that does not itself generate data to transfer during the relay of a specific data packet, merely serving the function of "relaying" the data packet. In operation 550, the relay node independently selects its own mode of data propagation. A relay node may, for example, select between a random differential propagation mode and standard diffusion mode. In operation 552, if the standard diffusion mode is selected, the relay node forwards the data packet to all of its entry nodes in operation 554. In the example of FIG. 5A, the selection of propagation mode is between two possible options; this example is not limiting and in other examples, there may be three or more possible modes of propagation. If, in the method 500 the selected mode is random differential propagation, the relay node performs the steps 556, 558 and 560 which correspond to the operations 504, 506 and 508 of FIG. 5.

Figure 6:
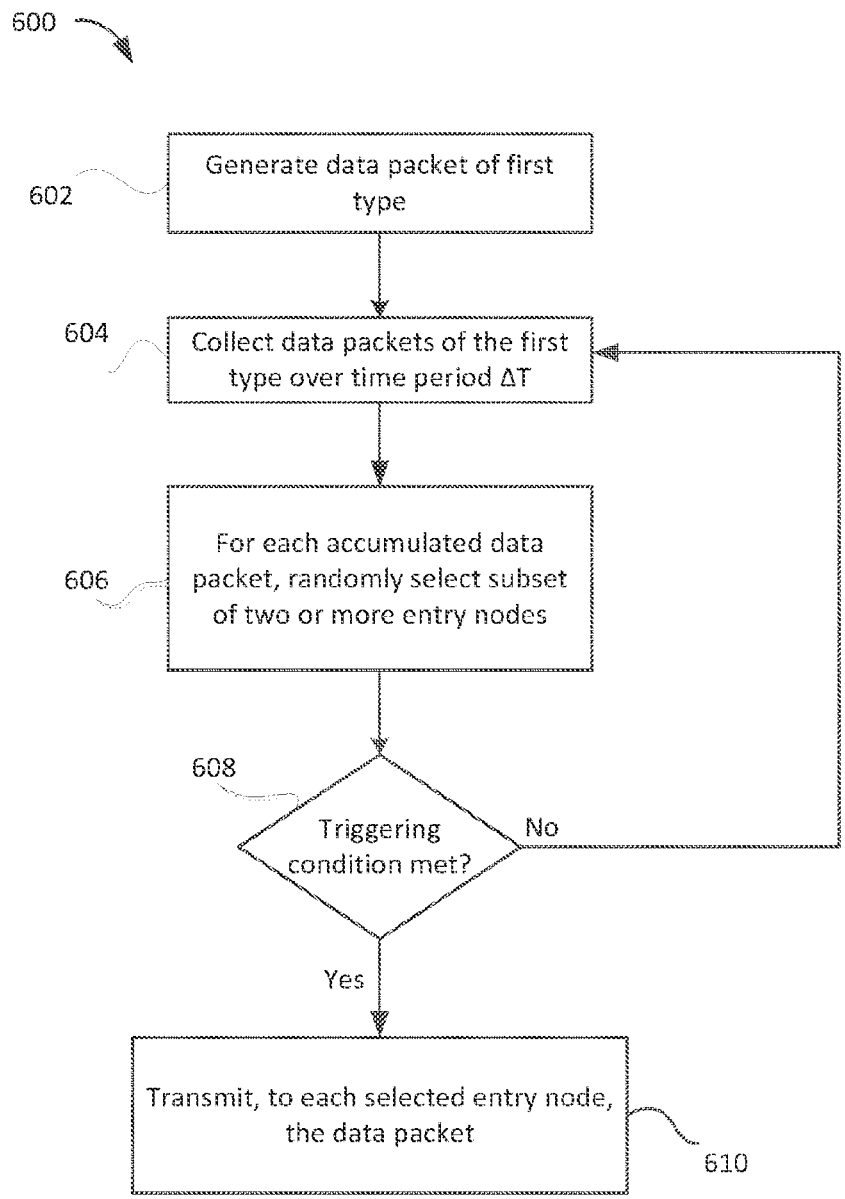
FIG. 6 shows, in flowchart form, another example process for propagating data packets in a blockchain network.

Reference will now be made to FIG. 6, which shows, in flowchart form, an example process 600 for propagating data packets in a network. The process 600 may be implemented at a blockchain node having a plurality of incoming and outgoing connections to other nodes of a blockchain network.

Operations 602, 604, 606 and 610 of process 600 correspond to operations 502, 504, 506 and 508 of process 500, respectively. In operation 608, the node determines whether a triggering condition has been met, prior to transmitting a collected data packet to its assigned entry node in operation 610. In particular, the transmitting of the data packet is performed in response to detecting that a suitable triggering condition has been satisfied. When the triggering condition has not been met, the node continues to collect data packets of the first type without relaying any of said data packets to its entry/peer nodes.

A triggering condition may be employed to direct the node to collect a sufficient number of incoming data packets and/or to collect incoming data packets for a sufficient amount of time. By collecting a plurality of incoming data packets prior to, for example, simultaneously propagating them to peer nodes in the network, an attacker that monitors the relay traffic originating from the node may not be able to easily identify the node as the correct source of the relayed data packets.

In some implementations, the triggering condition may be the expiry of a predetermined duration since the time of generation of the at least one data packet of the first type by the node in operation 602. That is, the node may be designed to monitor and collect incoming data packets (e.g. transactions) for a predetermined period of time that begins when the node generates a data packet of the same type, before any of said data packets are propagated by the node. This condition may be useful in trying to ensure that a data packet that is generated by the node is propagated after having collected more data packets of the same type that can be simultaneously broadcasted, thereby rendering it difficult for an attacker to correctly identify the node as the source of the generated data packet.

In some implementations, the triggering condition may be the expiry of a predetermined duration since the time of receipt of a first of the at least one incoming data packet of the first type from the node's peers. That is, the node may be designed to monitor and collect incoming data packets for a predetermined period of time that begins when a first of such incoming data packets is received. This condition may be useful in trying to ensure that more data packets, either data packets generated by the node itself or received from other peers, are collected by the node prior to any broadcast to the rest of the network.

In some implementations, the triggering condition may be the number of collected data packets during the first time period reaching a threshold number. In particular, the node may be designed to monitor and collect incoming data packets until the earlier of the expiry of the first time period or a predetermined threshold number of data packets being collected by the node.

Figure 7:
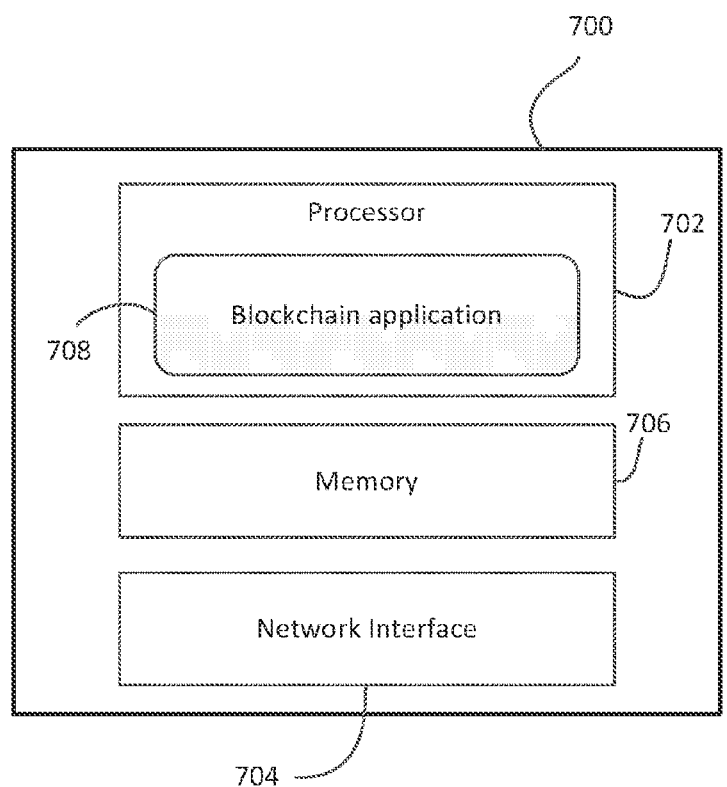
FIG. 7 shows, in block diagram form, an example blockchain node.

Reference will now be made to FIG. 7, which shows, in block diagram form, a simplified example of a participating node 700. The node 700 includes a processor 702, which may include one or more microprocessors, application specific integrated chips (ASICs), microcontrollers, or similar computer processing devices. The node 700 further includes memory 704, which may include persistent and non-persistent memory, to store values, variables, and in some instances processor-executable program instructions, and a network interface 706 to provide network connectivity over wired or wireless networks.

The node 700 includes a processor-executable blockchain application 708 containing processor-executable instructions that, when executed, cause the processor 702 to carry out one or more of the functions or operations described herein.

It will be understood that the devices and processes described herein and any module, routine, process, thread, application, or other software component implementing the described method/process for configuring the blockchain node may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A node to propagate data packets in a network of nodes, each node in the network having one or more connections to other nodes, the node comprising:
   a processor;
   a network interface to provide network connectivity; and
   memory including processor-executable instructions that, when executed by the processor, cause the processor to:
   collect a set of data packets of a first type during a first time period
   arbitrarily select two or more neighbouring nodes connected to the node for each data packet in the set; and
   transmit each data packet in the set to the selected two or more neighbouring nodes, wherein the node is further configured to transmit a command to a receiving node to forward a data packet using a mode of propagation based at least in part on a weighted random selection to balance a level of anonymity protection for the node with an overall speed of propagation.

2. The node claimed in claim 1, wherein processor-executable instructions that cause the processor to transmit each data packet are executed in response to a triggering condition that is based at least in part on collection of a sufficient number of incoming data packets and/or collection of incoming data packets for a sufficient amount of time.

3. The node claimed in claim 2, wherein the triggering condition comprises expiry of a predetermined duration since a time of generation of at least one data packet of the first type by the node.

4. The node claimed in claim 2, wherein the triggering condition comprises expiry of a predetermined duration since a time of receipt of a first of at least one data packet of the first type from one or more nodes in the network.

5. The node claimed in claim 2, wherein the triggering condition comprises a number of data packets collected during the first time period reaching a threshold number.

6. The node claimed in claim 1, wherein the first time period has a predefined length.

7. The node claimed in claim 1, wherein the processor-executable instructions, when executed, prevent the processor from transmitting any data packets of the first type during the first time period.

8. The node claimed in claim 1, wherein the command is transmitted with the data packet.

9. A computer-implemented method of propagating data packets in a network of nodes, each node in the network having one or more connections to other nodes, the method, implemented at one of the nodes, comprising:
   collecting a set of data packets of a first type during a first time period
   arbitrarily selecting two or more neighbouring nodes connected to the node for each data packet in the set;
   transmitting each data packet in the set to the selected two or more neighbouring nodes and;
   transmitting a command to a receiving node to forward a data packet using a mode of propagation based at least in part on a weighted random selection to balance a level of anonymity protection for the node with an overall speed of propagation.

10. The method claimed in claim 9, wherein transmitting each data packet is implemented in response to a triggering condition that is based at least in part on collection of a sufficient number of incoming data packets and/or collection of incoming data packets for a sufficient amount of time.

11. The method claimed in claim 10, wherein the triggering condition comprises expiry of a predetermined duration since a time of generation of at least one data packet of the first type by the node.

12. The method claimed in claim 11, wherein the triggering condition comprises expiry of a predetermined duration since a time of receipt of a first of at least one data packet of the first type from one or more nodes in the network.

13. The method claimed in claim 10, wherein the triggering condition comprises a number of data packets collected during the first time period reaching a threshold number.

14. The method claimed in claim 9, wherein the first time period has a predefined length.

15. The method claimed in claim 9, wherein the processor-executable instructions, when executed, prevent the processor from transmitting any data packets of the first type during the first time period.

16. The method according to claim 9, wherein the command is transmitted with the data packet.

17. A non-transitory processor-readable medium storing processor-executable instructions to participate in a process for propagating data packets in a network of nodes, wherein the processor-executable instructions, when executed by a processor in a node of the network of nodes, cause the processor to carry out the method claimed in claim 9.

* * * * *